(12) United States Patent
Lenzen et al.

(10) Patent No.: US 8,148,463 B2
(45) Date of Patent: Apr. 3, 2012

(54) ALKALINE RESOL PHENOL-ALDEHYDE RESIN BINDER COMPOSITIONS

(75) Inventors: Frank Lenzen, Dusseldorf (DE); Gerard Ladegourdie, Dusseldorf (DE)

(73) Assignee: Huttenes-Albertus Chemische Werke GmbH, Dusseldorf-Heerdt (DE)

( * ) Notice: Subject to any disclaimer, the term of this patent is extended or adjusted under 35 U.S.C. 154(b) by 208 days.

(21) Appl. No.: 12/329,720

(22) Filed: Dec. 8, 2008

(65) Prior Publication Data
US 2010/0130653 A1 May 27, 2010

(30) Foreign Application Priority Data

Nov. 25, 2008 (EP) .................................... 08169938

(51) Int. Cl.
C04B 26/12 (2006.01)
B22C 1/16 (2006.01)
B22C 1/20 (2006.01)
(52) U.S. Cl. .................... 524/594; 523/143; 523/145
(58) Field of Classification Search .............. 523/143, 523/145
See application file for complete search history.

(56) References Cited

U.S. PATENT DOCUMENTS

| | | | |
|---|---|---|---|
| 3,108,340 A * | 10/1963 | Peters et al. ............. | 164/16 |
| 3,499,861 A * | 3/1970 | Kujawa et al. ........... | 523/143 |
| 3,538,040 A * | 11/1970 | Grazen ..................... | 523/143 |
| 3,686,106 A * | 8/1972 | Tideswell et al. ........ | 523/143 |
| 4,252,700 A * | 2/1981 | Funabiki et al. ......... | 523/145 |
| 4,311,620 A * | 1/1982 | Sherwood et al. ........ | 523/143 |
| 4,362,203 A * | 12/1982 | Konii et al. .............. | 164/16 |
| 4,379,866 A * | 4/1983 | Henry et al. ............. | 523/140 |
| 4,452,927 A | 6/1984 | Matsushima et al. | |
| 4,977,209 A * | 12/1990 | Barker et al. ............. | 524/594 |
| 4,983,218 A * | 1/1991 | Mascioli .................. | 106/600 |
| 4,985,489 A * | 1/1991 | Barker et al. ............. | 524/594 |
| 5,051,454 A * | 9/1991 | Lemon et al. ............. | 523/146 |
| 5,145,887 A * | 9/1992 | Taylor et al. ............. | 523/145 |
| 5,179,177 A * | 1/1993 | Gerber .................... | 525/506 |
| 5,242,957 A * | 9/1993 | Smith et al. .............. | 523/145 |
| 5,264,535 A * | 11/1993 | Geoffrey et al. .......... | 528/137 |
| 5,340,888 A * | 8/1994 | Lemon et al. ............. | 525/501 |
| 6,378,599 B1 * | 4/2002 | Schmidt et al. ........... | 164/525 |

FOREIGN PATENT DOCUMENTS

| | | |
|---|---|---|
| WO | WO 85/00822 | 2/1985 |
| WO | WO 97/18913 | 5/1997 |
| WO | WO 01/12709 | 2/2001 |
| WO | WO 03/016400 | 2/2003 |

* cited by examiner

*Primary Examiner* — Robert Loewe
(74) *Attorney, Agent, or Firm* — Duane Morris LLP; J. Rodman Steele, Jr.; Gregory M. Lefkowitz

(57) ABSTRACT

This invention relates to alkaline resol phenol-aldehyde binder compositions and their use in the production of articles of bonded particulate material such as foundry moulds, foundry cores, or feeders.

20 Claims, No Drawings

ALKALINE RESOL PHENOL-ALDEHYDE RESIN BINDER COMPOSITIONS

This invention relates to alkaline resol phenol-aldehyde binder compositions and their use in the production of articles of bonded particulate material such as foundry moulds, foundry cores or feeders.

EP 0 211 799 discloses a binder composition comprising an aqueous basic solution of a phenol formaldehyde resin which is to be cured according to Patent EP-PS 86615 with an gaseous alkylformiate and including a modifier consisting of glycerin and optionally 1-10% by weight polyethylene glycol. EP 0 211 799 does not however disclose resins containing oxyanions.

EP 0 323 096 B2 describes a binder composition comprising an alkaline aqueous solution of a resol phenol-aldehyde resin and an oxyanion which can form a stable complex between the resin and the oxyanion. EP 0 323 096 B2 also describes a process for the production of an article of bonded particulate material, such as a foundry mould or core, in which a mixture of particulate material and the binder composition is formed to a desired shape, and carbon dioxide gas is then passed through the formed shape so as to cause the oxyanion to form a stable complex with the resin and thereby to cure the resin.

EP 0 503 758 B1 discloses a binder composition comprising an alkaline aqueous solution of a resol phenol-aldehyde resin and an oxyanion which can form a stable complex with the resin, wherein the amount of alkali present in the solution is sufficient to substantially prevent stable complex formation between the resin and the oxyanion characterized in that the binder composition has a molar ratio of alkali to phenol of from 1.5:1 to 2.5:1 and the binder composition also contains an ethylene glycol monoalkyl ether.

EP 0 503 759 B1 discloses a binder composition comprising an alkaline aqueous solution of a resol phenol-aldehyde resin an oxyanion which can form a stable complex with the resin, wherein the amount of alkali present in the solution is sufficient to substantially prevent stable complex formation between the resin and the oxyanion, characterized in that the binder composition also contains pyrrolidone or an N-substituted pyrrolidone and that the pyrrolidone or N-substituted pyrrolidone is present in an amount of 1% to 10% by weight based on the weight of the binder composition.

EP 0 508 566 B1 discloses a binder composition comprising an alkaline aqueous solution of a resol phenol-aldehyde resin and an oxyanion which can form a stable complex with the resin, wherein the amount of alkali present in the solution is sufficient to substantially prevent stable complex formation between the resin and the oxyanion, characterised in that the binder composition has a molar ratio of alkali to phenol of from 1.5:1 to 2.5:1 and the binder composition also contains phenyl ethylene glycol ether.

EP 0 556 955 discloses a binder composition comprising an alkaline aqueous solution of a resol phenol-aldehyde resin and an oxyanion which can form a stable complex with the resin, wherein the amount of alkali present in the solution is sufficient to substantially prevent stable complex formation between the resin and the oxyanion, characterized in that the binder composition also contains a propylene glycol alkyl ether in an amount such that the propylene glycol alkyl ether is miscible with the aqueous solution.

It has now surprisingly been found that a binder composition which can be produced by addition of polyalkylene glycol to an alkaline aqueous mixture comprising a base resol phenol-aldehyde resin and an oxyanion which can form a stable complex with the base resin,
wherein the amount of alkali present in the binder composition is sufficient to substantially prevent stable complex formation between the resin present in the binder composition and the oxyanion,
and
wherein the binder composition has a molar ratio of alkali, expressed as hydroxyl ions, to phenol of from 1.0:1 to 2.5:1, preferably of from 1.5:1 to 2.5:1. For a selection of specific improvements see below.

Correspondingly, according to the present invention there is provided a binder composition which can be produced by addition of polyalkylene glycol to an alkaline aqueous mixture comprising a base resol phenol-aldehyde resin and an oxyanion which can form a stable complex with the base resin,
wherein the amount of alkali present in the binder composition is sufficient to substantially prevent stable complex formation between the resin present in the binder composition and the oxyanion,
and
wherein the binder composition has a molar ratio of alkali, expressed as hydroxyl ions, to phenol of from 1.0:1 to 2.5:1, preferably of from 1.5:1 to 2.5:1.

The term "polyalkylene glycol" comprises dialkylene glycols, and the technically preferred polyalkylene glycols with 3 or more alkylene glycol units. As to preferred polyalkylene glycols, see below.

The mechanism of complex formation, especially formation of stable complexes, between the resin and the oxyanion is discussed in EP 0 323 096 B2, page 2, paragraph [0010].

Suitable resol phenol-aldehyde resins and oxyanions for use in the binder compositions of the invention, and suitable methods for producing the resin are described in EP 0 323 096 A and B2. See in particular EP 0 323 096 B2, page 2, paragraphs [0011] to [0027].

The preferred resol phenol-aldehyde resin is one which contains predominantly molecules in which adjacent phenolic residues are linked together by methylene groups forming bridges between the ortho and para positions because such molecules have a large number of sites for complexing with the oxyanions. Molecules in which the phenolic residues are linked by ortho-ortho methylene bridges have very few sites for complexing with oxyanions, (in the case of a linear molecule only one site at each end), and it is therefore desirable that such molecules are absent, or that they are present in the resin in relatively small numbers. Resins containing molecules having phenolic residues linked by a combination of ortho-para methylene bridges and ortho-ortho may be used but are less preferred.

In order to maximise the number of sites for oxyanion complexing all the available positions on the phenolic residues which are ortho to the phenolic hydroxyl group in an ortho-para methylene bridged molecule should be methylolated.

The phenol which is used to produce the resol phenol-aldehyde resin is preferably one which produces a condensation product when reacted with an aldehyde having the highest possible number of ortho-methylol groups. The preferred phenol is phenol itself. Substituted phenols such as p-cresol or m-cresol, or phenolic compounds such as p-phenol sulphonic acids may be used, either on their own or in a combination with phenol, but these produce resins which give inferior results compared to the results given by resins produced from phenol itself. p-Cresol for example, can only form phenol-aldehyde molecules in which the phenolic residues are linked by ortho-ortho methylene bridges and the molecules can therefore only complex with the oxyanions at their ends.

The aldehyde may be for example, formaldehyde, butyraldehyde, glyoxal or furfuraldehyde. Formaldehyde is preferred.

The resol phenol-aldehyde resin is preferably produced by the condensation of the phenol and the aldehyde in the presence of a base catalyst which may be for example ammonium hydroxide or an alkali metal hydroxide such as sodium hydroxide or potassium hydroxide. Alkali metal hydroxide catalysts are preferred because they produce a resin in which the phenolic residues are linked predominantly by ortho-para or para-para methylene bridges and from which phenolic residues linked by ortho-ortho methylene bridges are essentially absent.

Other catalysts, such as zinc acetate, may be used, either on their own or in combination with an alkali metal hydroxide. Such catalysts as zinc acetate yield resins having a mixed is bridging structure containing ortho-ortho benzylic ether bridges and ortho-para methylene bridges, which in certain cases is preferred. The mole ratio of aldehyde (expressed as formaldehyde) to phenol in the resin may be in the range of from 1:1 to 3:1 but is preferably in the range from 1.6:1 to 2.5:1, more preferably 2.2:1 to 2.4:1

After production the resol phenol-aldehyde resin is made alkaline by the addition of, for example, sodium hydroxide or potassium hydroxide, which is conveniently added as an aqueous solution. The preferred alkali is potassium hydroxide because it results in a binder composition having a lower viscosity for a given degree of polymerisation of the resin compared to sodium hydroxide and the performance of the binder composition is superior.

The molar ratio of the total alkali present in the binder (expressed as hydroxyl ions) to phenol is preferably in the range of 1.0:1 to 2.5:1, more preferably 1.5:1 to 2.5:1. The total alkali includes any alkali used as catalyst in the synthesis of the resin, any additional alkali which may be added during the synthesis and alkali added after synthesis of the resin and during manufacture of the binder.

Examples of suitable oxyanions for use in the process and binder composition of the invention include borate, stannate and aluminate ions. Borate ions are preferred as well as aluminate ions (as described in DE 199 38 048 C2).

The oxyanion may be introduced into the binder composition by the addition of for example alkali metal oxyanion salts such as sodium tetraborate decahydrate, potassium tetraborate tetrahydrate, sodium metaborate, sodium pentaborate, sodium stannate trihydrate or sodium aluminate, or an ammonium oxyanion salt such as ammonium borate. Borate ions may also be introduced by the addition of boric acid or they may be formed by reaction between added boric oxide and alkali in the binder solution.

The mole ratio of oxyanions (expressed as boron, tin etc.) to phenol is preferably in the range of from 0.1:1 to 1:1. When the oxyanion is borate the mole ratio of boron to phenol is more preferably in the range of from 0.2 to 0.4.

It is preferred that in a binder composition according to the present invention the polyalkylene glycol is added in an amount such that the polyalkylene glycol is miscible with the aqueous solution.

According to a further aspect of the invention there is provided a process for the production of an article of bonded particulate material in which a mixture comprising particulate is material and a binder composition is formed to a desired shape and the binder composition is cured by passing carbon dioxide gas through the formed shape, wherein the binder composition used is a composition according to the present invention as described above.

When the binder composition of the present invention is used in a process according to the invention in order to produce foundry moulds, foundry cores or feeders from particulate (refractory) materials the particulate (refractory) material may be selected from any such materials known for that use. Examples of suitable materials include silica, olivine, chromite and zircon sands.

Preferred is a process for the production of an article of bonded particulate material comprising forming to the desired shape (in particular the shape of a foundry core, a foundry mould, or a feeder) a mixture of particulate material and a binder composition comprising an alkaline aqueous solution of a resol phenol-aldehyde resin, an oxyanion which can form a stable complex with the resin, and a polyalkylene glycol in an amount such that the polyalkylene glycol is miscible with the aqueous solution, and passing carbon dioxide gas through the formed shape so as to cause the oxyanion to form a stable complex with the resin, and thereby to cure the resin. The binder composition and the process of the invention are of particular value for making foundry moulds, foundry cores, and feeders and it is in particular with reference to that application that the invention will be described.

As stated above, suitable phenol-aldehyde resins and oxyanions for use in the binder compositions of the invention, and suitable methods for producing the phenol-aldehyde resin are described in EP 0 323 096 A.

Suitable polyalkylene glycols are those which in the amounts needed to produce beneficial effects on the performance of the binder composition are miscible with the alkaline aqueous binder solution. Examples of suitable polyalkylene glycol are polyethylene glycol (in particular polyethylene glycol 200-2000), polypropylene glycol etc. In preferred binder compositions of the present invention the polyalkylene glycol is polyethylene glycol or a mixture of polyethylene glycol with a further polyalkylene glycol, preferably polypropylene glycol. As the chain length of the polyalkylene glycols increase the polyalkylene glycols become more hydrophobic. As a result certain polyalkylene glycols are immiscible with the aqueous binder solution at all addition levels, and other polyalkylene glycols of shorter carbon chain length of the monomers are only miscible with the aqueous binder solution at low addition levels.

The amount of polyalkylene glycol added is therefore dependent on the chemical composition of the particular polyalkylene glycol, and is preferably in the range of 1% to 40% by weight based on the weight of the binder composition.

In contrast to the solvents used in some of the prior art documents described above, the polyalkylene glycols used in the present invention have two OH-groups and several ether oxygen atoms per molecule. Not wishing to be bound by any theory, it appears that as a result they interact with the components of the binder composition in a much stronger way than the solvents used in the prior art documents discussed above, as generally the presence of polyalkylene glycol cannot be detected in the binder composition of the present invention, neither by GC nor by GC/MS. Apparently, at least part of the polyalkylene glycol present in binder compositions of the present invention reacts with other components of the binder composition. They may react for example with cations (e.g potassium ions) present in the binder composition to form stable adducts or complexes, for example similar to crown ether complexes, and/or the OH-groups may react with the resin or the oxyanions to form ethers. Therefore, the polyalkylene glycol added is considered to be a reactive solvent and at least part of the polyalkylene glycol added to the present binder composition appears to work as a performance enhancing additive rather than a solvent. Thus, the resin present in a binder composition of the present invention is (a) the base resin, (b) base resin modified by reaction with polyalkylene glycol, or (c) a mixture of (a) and (b).

The addition of the polyalkylene glycol has, as tests have now shown, one or more beneficial effects on the performance of the binder composition as a binder for making foundry moulds, foundry cores and feeders, depending on the composition of the particular resin and the polyalkylene glycol used.

The beneficial effects include:

(I) improved mould, core or feeder strength immediately after gassing with carbon dioxide gas (see examples, below), (II) improved strength after gassed moulds, cores or feeders have been stored before use, for example for up to 24 hours or longer (see examples, below), (III) improved strength of moulds, cores or feeders which have been coated with an alcohol based coating which has been dried by burning off the alcohol, prior to storage of the moulds, cores or feeders.

(IV) improved mixed sand flowability (in particular in comparison with typical binder compositions comprising butyl diglycol), (V) improved mould, core or feeder surface finish and edge hardness, (VI) reduced smell, especially during core preparation (in particular in comparison with binder compositions comprising diethylene glycol mono n-butyl ether, see EP 0 503 758).

In a preferred binder composition according to the present invention the polyalkylene glycol is added in an amount of 1% to 40% by weight based on the total weight of the binder composition. However, an amount of polyalkylene glycol of 3% to 15% by weight based on the total weight of the binder composition is preferred, and it has been found that further benefits in terms of improved storage properties, higher bending strength of cores, moulds and feeders, can especially be obtained at amounts in the range of 3% to 15%, in particular when using polyethylene glycol. Higher amounts in certain cases result in a decreased bending strength.

The binder composition of the invention preferably additionally contains a silane. The silane preferably is gammaminopropyltriethoxysilane, N-(2-aminoethyl)-3-aminopropyltrimethoxysilane, phenol trimethoxysilane or gammaglycidoxypropyltrimethoxysilane, or a mixture thereof. It is preferred that the total amount of silane present is from 0.2% to 1.0% by weight based on the weight of the binder composition.

A further aspect of the present invention relates to the use of a polyalkylene glycol as solvent or solvent constituent and/or performance enhancing additive in a binder composition comprising an alkaline aqueous solution of a resol phenol-aldehyde resin and an oxyanion which can form a stable complex with the resin,
wherein the amount of alkali present in the solution is sufficient to substantially prevent stable complex formation between the resin and the oxyanion,
wherein the binder composition has a molar ratio of alkali expressed as hydroxyl ions, to phenol of from 1.0:1 to 2.5:1, preferably of from 1.5:1 to 2.5:1.

The explanations given above regarding preferred constituents of the binder composition apply mutatis mutandis.

I.e., preferred is a use according to the present invention, wherein the polyalkylene glycol is polyethylene glycol or a mixture of polyethylene glycol with a further polyalkylene glycol, preferably polypropylene glycol. The polyalkylene glycol is preferably used in an amount of 1% to 40%, preferably in an amount of 3% to 15% by weight based on the total weight of the binder composition. The binder composition preferably contains in addition to the binder components and the polyalkylene glycol a silane, preferably, gammaminopropyltriethoxysilane, N-(2-aminoethyl)-3-aminopropyltrimethoxysilane, phenol trimethoxysilane or gammaglycidoxypropyltri-methoxysilane, preferably in an amount of from 0.2% to 1.0% by weight based on the total weight of the binder composition.

A further aspect of the present invention relates to a method of preparing a binder composition, in particular a binder composition according to the present invention (as defined above), the method comprising the following step:

Preparing an alkaline aqueous mixture comprising a base resol phenol-aldehyde resin, an oxyanion and a polyalkylene glycol, wherein the oxyanion can form a stable complex with the resin present in said mixture, wherein the amount of alkali present in said mixture is sufficient to substantially prevent stable complex formation between the resin present in said mixture and the oxyanion, wherein the mixture has a molar ratio of alkali, expressed as hydroxyl ions, to phenol of from 1.0:1 to 2.5:1, preferably of from 1.5:1 to 2.5:1.

Again, the explanations given above regarding preferred constituents of the binder composition apply mutatis mutandis.

Thus, in a method of the present invention the polyalkylene glycol is preferably used in an amount of 1% to 40%, preferably an amount of 3% to 15% by weight based on the total weight of the binder. Higher amounts in certain cases result in a decreased bending strength.

An article according to the present invention, namely an article of bonded particulate material, is producible by the process according to the present invention and/or comprises a hardened binder composition, the binder composition being a binder composition according to the present invention.

A preferred article of the present invention of bonded particulate material is a foundry mould, a foundry core or a feeder. The expert in the art will take care that the materials used are compatible with each other. The feeders should, for example not contain any other constituents, e.g. aluminum, in a form that may react with constituents of the binder composition, e.g. alkali hydroxide, in a way that would diminish the performance of the articles.

The explanations given above regarding preferred constituents of the binder composition as well as the explanations given regarding the process for the production of an article of bonded particulate material apply mutatis mutandis.

In the following the invention is further explained by examples:

EXAMPLES

The comparative examples 1 to 7 and the corresponding binders (binder compositions) 1 to 7 described hereinbelow are for comparison purposes only and are no examples/binders according to the present invention.

A resol phenol-formaldehyde resin (not according to the invention) was prepared generally according to the procedure described in EP 0 508 566 B1, page 3, Example 1, lines 1-36, with a minor deviation in step 7 (see below).

Thus, a resol phenol-formaldehyde resin was synthesized having the following composition:

| | |
|---|---|
| Phenol | 800.00 g |
| 91% W/W paraformaldehyde | 642.20 g |
| 50% W/W sodium hydroxide solution | 40.85 g |
| Formaldehyde:Phenol molar ratio | 2.3:1 |
| OH⁻ (from alkali):Phenol molar ratio | 0.06:1 |
| Water in starting composition | 5.2% W/W |

The following procedure was used:

1. Charge and melt phenol
2. Charge paraformaldehyde and part of the sodium hydroxide solution and heat to 60-65° C. at a rate of 1° C. per minute
3. Cool to counteract exothermic reaction and maintain at 60-65° C. while adding the remainder of the sodium hydroxide solution over a period of 1 hour
4. Heat to 75° C. at a rate of 1° C. per minute
5. Maintain at 75° C. for 30 minutes
6. Heat to 85° C. at a rate of 1° C. per minute
7. Maintain at 85° C. for sufficient time for the resin to reach a viscosity of 4000-6000 cp at 25° C. as measured on a 25 g sample diluted with 15 g of 50% w/w aqueous potassium hydroxide solution using the procedure according to DIN 53018 Part 2 (instead of the procedure according to EP 0 508 566 B1).

Using the resin thus obtained, base binder 1 was prepared according to Example 1 of EP 0 508 566.

Thus, the resin was used to produce a base binder 1 having the following composition by weight:

| | |
|---|---|
| Resin | 25 parts |
| 50% W/W Aqueous potassium hydroxide solution | 35 parts |
| Borax | 5.5 parts |
| gammaaminopropyltriethoxysilane | 0.39 parts |

The potassium hydroxide solution was added to the resin, the temperature rise due to exothermic reaction was controlled and the resin was cooled. The borax was added and mixed into the resin until it had dissolved. The silane was then added at a temperature of below 30° C. The molar ratio of alkali to phenol was approximately 2:1.

The resulting binder is the Base Binder.

Comparative Example 1

Binder 1

Base Binder, prepared as described above (similar to Binder 1 of Example 1 of EP 0 508 566).

Comparative Example 2

Binder 2

A composition was prepared by dissolving 2% by weight of pure phenyl monoethylene glycol ether (2-phenoxyethanol) in 98% by weight of the Base Binder, prepared as described above (similar to Binder 2 of Example 1 of EP 0 508 566).

Comparative Example 3

Binder 3

A composition was prepared by dissolving 5% by weight of pure phenyl monothylene glycol ether 95% by weight of the Base Binder, prepared as described above (similar to Binder 3 of Example 2 of EP 0 508 566).

Comparative Example 4

Binder 4

A composition was prepared by dissolving 5% by weight of pure ethylene glycol monomethyl ether in 95% by weight of the Base Binder, (similar to Binder 6 of Example 2 of EP 0 503 758).

Comparative Example 5

Binder 5

A composition was prepared by dissolving 5% by weight of pure triethylene glycol monomethyl ether in 95% by weight of the Base Binder (similar to Binder 14 of Example 4 of EP 0 503 758).

Comparative Example 6

Binder 6

A composition was prepared by dissolving 5% by weight of pure dipropylene glycol methyl ether in 95% by weight of the Base Binder (similar to Binder 5 of Example 1 of EP 0 556 955).

Comparative Example 7

Binder 7

A composition was prepared by dissolving 5% by weight of pure N-methyl-2-pyrrolidone in 95% by weight of the Base Binder (similar to Binder 8 of Example 3 of EP 0 503 759).

Example 1

Binder Composition 8 (Binder 8)

A binder composition according to the invention was prepared by dissolving 5% by weight of pure polyethylene glycol 400 in 95% by weight of the Base Binder.

Implementation Example

General Procedure

All binder compositions 1 to 8 were tested as binders for foundry sand according to the following procedure:

3 parts by weight of the respective binder was mixed with Silica sand H33 sand (AFS 46) and the mixture was used to prepare cores according to the method described in VDGP73 (Verein Deutscher Giessereifachleute, Merkblatt P 73, February 1996).

The cores were hardened by the passage of carbon dioxide gas for different times at a pressure of 1 bar line pressure and a flowrate of 6.0 liters per minute. Some of the cores were tested immediately after gassing.

Some were tested after storage for 3 days in dry storage conditions (temperature 17 to 20° C., relative humidity 30-35%) and others were tested after storage for 3 days under humid storage conditions (temperature 26 to 28° C., relative humidity 85 to 90%). The bending strength results obtained are shown in Table 1 below.

As can be seen from table 1, the bending strength of the core based on binder composition 8 according to the present invention is superior to all comparative examples, with only comparative example 4 showing a superior bending strength after 3 days humid storage and 30 seconds gassing time.

TABLE 1

(Bending strength)

| Binder | Additive | As gassed Gassing time (seconds) | | | Dry storage Gassing time (seconds) | | | Humid storage Storage under humid conditions (relative humidity 85-90%) Gassing time (seconds) | | |
|---|---|---|---|---|---|---|---|---|---|---|
| | | 30 | 60 | 120 | 30 | 60 | 120 | 30 | 60 | 120 |
| Binder 1 (comparison) | without any additive | 35 | 42 | 50 | 46 | 44 | 45 | 36 | 38 | 38 |
| Binder 2 (comparison) | 2% phenyl monoethylene glycol ether | 53 | 60 | 66 | 72 | 62 | 75 | 60 | 62 | 60 |
| Binder 3 (comparison) | 5% phenyl monoethylene glycol ether | 52 | 61 | 68 | 79 | 84 | 80 | 68 | 66 | 66 |
| Binder 4 (comparison) | 5% ethylene glycol monomethyl ether | 52 | 58 | 61 | 107 | 109 | 111 | 89 | 85 | 85 |
| Binder 5 (comparison) | 5% triethylene glycol monomethyl ether | 43 | 49 | 54 | 119 | 133 | 128 | 71 | 71 | 65 |
| Binder 6 (comparison) | 5% dipropylene glycolmethyl ether | 38 | 40 | 46 | 81 | 74 | 76 | 74 | 71 | 49 |
| Binder 7 (comparison) | 5% N-methyl-2-pyrrolidone | 40 | 47 | 50 | 100 | 107 | 102 | 68 | 66 | 67 |
| Binder 8 (according to the present invention) | 5% polyethylene glycol 400 | 58 | 63 | 70 | 123 | 140 | 133 | 83 | 88 | 90 |

The invention claimed is:

1. A binder composition produced by addition of polyalkylene glycol, comprising three or more alkylene glycol units, to an alkaline aqueous mixture comprising a base resol phenol-aldehyde resin and an oxyanion, wherein the oxyanion is capable of forming a stable complex with the base resin,
   wherein the amount of alkali present in the binder composition is sufficient to substantially prevent stable complex formation between the resin present in the binder composition and the oxyanion,
   wherein the polyalkylene glycol comprises polyethylene glycol having a molecular weight from 200 to 2000 in an amount that is miscible in the alkaline aqueous mixture and in an amount from 1% to 20% by weight based on the total weight of the binder composition, and
   wherein the binder composition has a molar ratio of alkali, expressed as hydroxyl ions, to phenol of from 1.0:1 to 2.5:1.

2. A binder composition according to claim 1, characterized in that the further polyalkylene glycol comprises polypropylene glycol.

3. A binder composition according to claim 1, characterized in that the polyalkylene glycol is added in an amount of 3% to 15% by weight based on the total weight of the binder composition.

4. A binder composition according to claim 1 characterized in that the composition contains in addition a silane.

5. A binder composition according to claim 4 characterized in that the silane is gamma-aminopropyltriethoxysilane, N-(2-aminoethyl)-3-aminopropyltrimethoxysilane, phenol trimethoxysilane or gamma-glycidoxypropyltrimethoxysilane, or a mixture thereof.

6. A binder composition according to claim 4 characterized in that the total amount of silane present is from 0.2% to 1.0% by weight based on the weight of the binder composition.

7. A process for the production of an article of bonded particulate material in which a mixture comprising particulate material and a binder composition is formed to a desired shape and the binder composition is cured by passing carbon dioxide gas through the formed shape, characterized in that the binder composition used is a composition according to claim 1.

8. The process according to claim 7, wherein the binder composition comprises polyethylene glycol in an amount from 3% to 15% by weight based on the total weight of the binder composition.

9. A method of preparing a binder composition according to claim 1 comprising:
   preparing an alkaline aqueous mixture comprising a base resol phenol-aldehyde resin, an oxyanion and a polyalkylene glycol, wherein the oxyanion can form a stable complex with the resin present in said mixture, wherein the amount of alkali present in said mixture is sufficient to substantially prevent stable complex formation between the resin present in said mixture and the oxyanion, wherein the mixture has a molar ratio of alkali, expressed as hydroxyl ions, to phenol of from 1.0:1 to 2.5:1.

10. The method according to claim 9, wherein the polyalkylene glycol is used in an amount of 3% to 15% based on the total weight of the binder composition.

11. An article of bonded particulate material
   produced by the process according to claim 7, or
   comprising a hardened binder composition, the binder composition being a binder composition according to claim 1.

12. The article of bonded particulate material according to claim 11, wherein the article is a foundry mould, a foundry core or a feeder.

13. The article according to claim 11, wherein the binder composition utilized in the process according to claim 8 or the binder composition according to claim 1, comprises polyethylene glycol in an amount from 3% to 15% by weight based on the total weight of the binder composition.

14. The binder composition according to claim 1, wherein said further polyalkylene glycol comprises polypropylene glycol.

15. A method of enhancing the performance of binder composition comprising an alkaline aqueous solution of a resol phenol-aldehyde resin and an oxyanion capable of forming a stable complex with the resin, wherein the amount of alkali present in the solution is sufficient to substantially prevent stable complex formation between the resin and the oxyanion, and wherein the binder composition has a molar ratio of alkali, expressed as hydroxyl ions, to phenol of from 1.0:1 to 2.5:1, said method comprising:

including a polyalkylene glycol, comprising 3 or more alkylene glycol units, in said binder composition, wherein the polyalkylene glycol comprises polyethylene glycol having a molecular weight from 200 to 2000 in an amount that is miscible in the alkaline aqueous mixture and in an amount from 1% to 20% by weight based on the total weight of the binder composition.

16. The method according to claim 15, characterized in that the further polyalkylene glycol comprises polypropylene glycol.

17. The method according to claim 15 characterized in that the composition further comprises a silane.

18. The method of claim 17, said silane comprising a silane selected from the group consisting of gamma-aminopropyltriethoxysilane, N-(2-aminoethyl)-3-aminopropyltrimethoxysilane, phenol trimethoxysilane, gamma-glycidoxypropyltrimethoxysilane, and combinations thereof.

19. The method of claim 17, said silane present in an amount of from 0.2% to 1.0% by weight based on the total weight of the binder composition.

20. The method according to claim 15, characterized in that the polyakylene glycol is used in an amount of 3% to 15% by weight based on the total weight of the binder composition.

* * * * *